March 11, 1969
B. T. O'LOUGHLIN ET AL
3,432,151
PORTABLE SAND-FLUID BLENDER
Filed Jan. 26, 1967
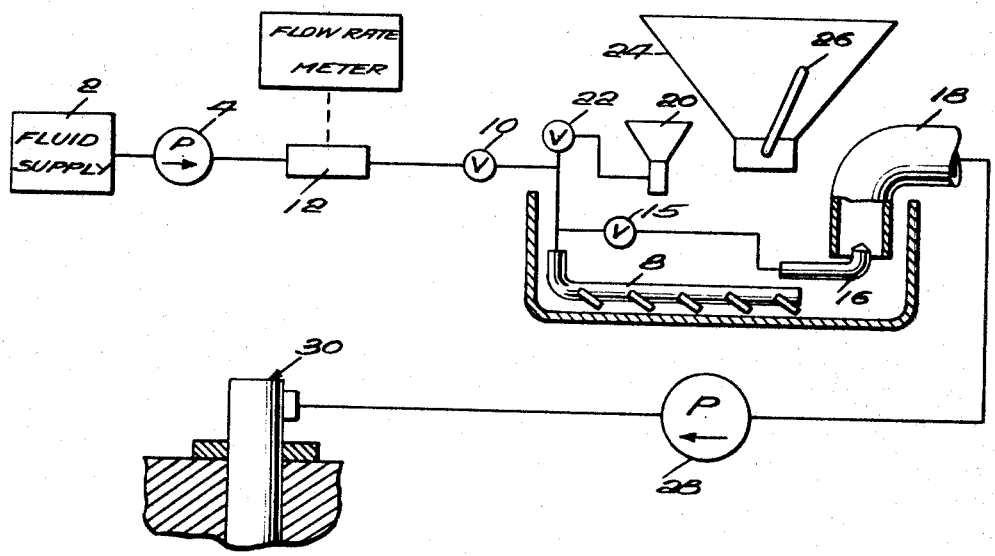
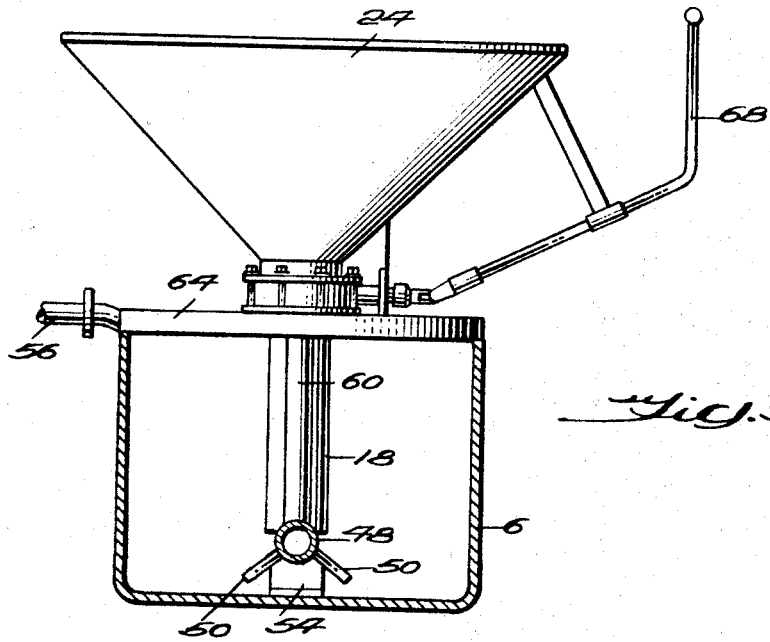
INVENTORS
BERNARD T. O'LOUGHLIN,
WILLIAM A. TINDELL,
BY
Burns, Doane, Benedict, Swecker & Mathis
ATTORNEYS

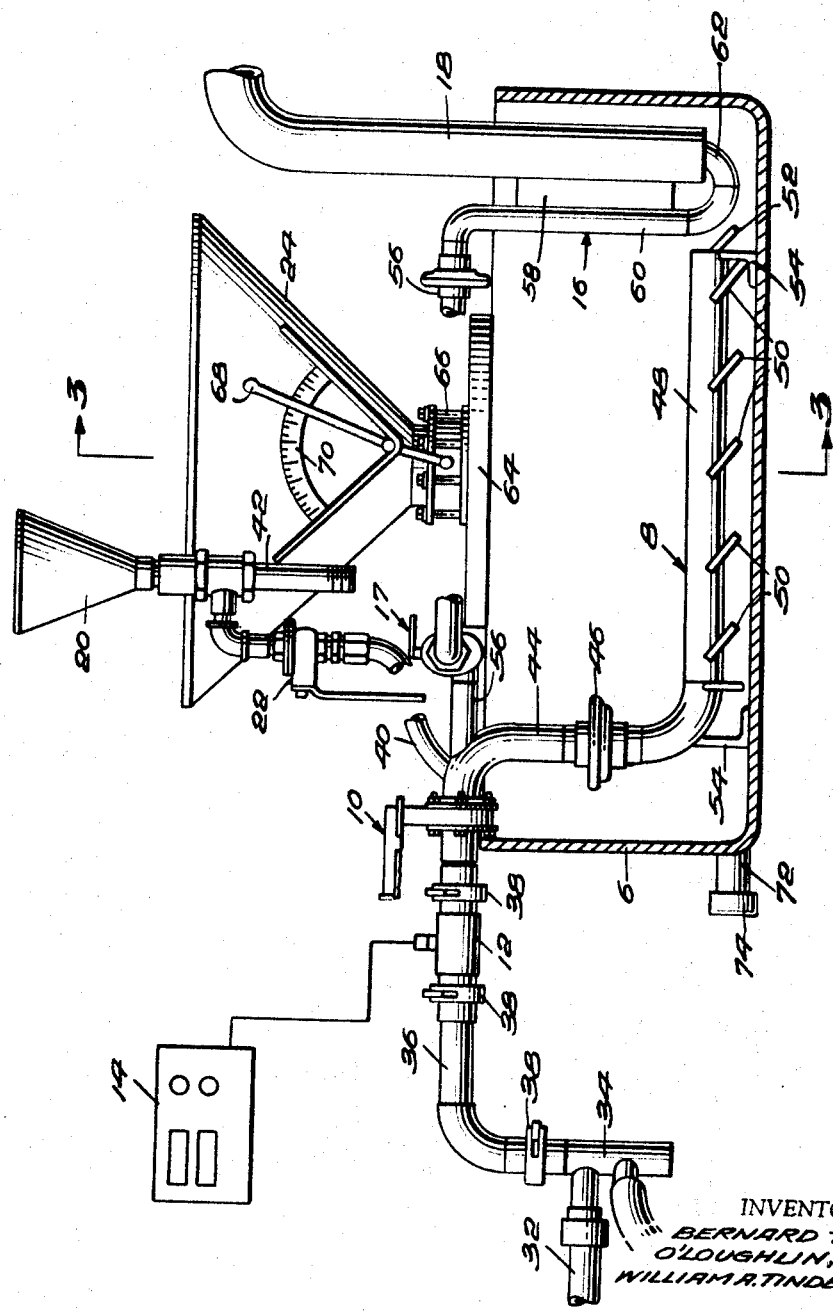

United States Patent Office 3,432,151
Patented Mar. 11, 1969

3,432,151
PORTABLE SAND-FLUID BLENDER
Bernard T. O'Loughlin, Duncan, Okla., and William A. Tindell, Jr., Dallas, Tex., assignors to Halliburton Company, Duncan, Okla., a corporation of Delaware
Filed Jan. 26, 1967, Ser. No. 611,918
U.S. Cl. 259—148        10 Claims
Int. Cl. B28c

ABSTRACT OF THE DISCLOSURE

The blending of solid, insoluble particulate material with a liquid is carried out in a blending tub by pumping the liquid at a known flow rate into the tub through an agitating manifold. The manifold has a plurality of nozzles which direct the liquid into the tub with sufficient velocity to cause thorough agitation of the liquid in the tub. Sand, or other particulate material, is dispensed at a measured rate into the tub where it mixes with the liquid and the sand-liquid blend is drawn into the suction pipe of a pump. A portion of the liquid bypasses the agitating manifold and flows directly into the discharge pipe to boost the pump suction. By correlating the sand flow rate with the liquid flow rate, blends of a predetermined concentration can be produced.

Background of the invention

This invention relates to blending liquids and solid, insoluble particulate material in varying concentrations, and more particularly to a method and apparatus for blending predetermined concentrations of sand, or similar particulate material, with liquids for use in well operations.

Hydraulic fracturing of a well involves pumping fluid into the well under pressure to cause parting of a desired section of the formation. By continuing to pump fluid into the well, the initial fracture may be extended outwardly from the well bore to greater distances. It is common practice to add solid particles to the fracturing fluid that is pumped into the fracture. These particles act as propping agents to hold the fracture open when the applied pressure is reduced, thus leaving a channel through which oil or other fluid can flow from the formation into the well bore. Sand is commonly used as a propping agent. The sand preferably is carefully graded as to size, and rounded grain, rather than angular type sands are used.

In carrying out a fracturing process, a fracturing fluid, such as oil is blended with sand, or another propping agent. The concentration of the propping agent in the fracturing fluid must be accurately controlled according to well conditions in order to obtain optimum results from the treatment. Generally, most formations will take fracturing fluids containing as much as one pound of sand per gallon, but in certain formations it has been found that fracturing fluid having higher concentrations of sand can be injected into the formation only by starting the process with a low sand concentration and gradually increasing the concentration. Thus, it is not only important to know the exact sand concentration as it is being pumped into the well, but also to be able to vary the sand concentration during the fracturing process.

Accordingly, it is an object of this invention to provide an improved method and apparatus for blending fracturing fluids.

It is a further object of this invention to provide a method and apparatus for blending fracturing fluids at relatively low flow rates with a minimum of sand remaining in the blender tank.

It is a further object of this invention to provide a method and apparatus for accurately controlling the sand concentration in blending fracturing fluids at relatively low flow rates.

Summary of the invention

These objects are accomplished in accordance with a preferred embodiment of the invention by blending the liquid with the solid, insoluble propping agent in a tank. A plurality of streams of the liquid is introduced below the liquid level in the tank with sufficient velocity to agitate the liquid. The propping agent is dispensed into the tank, where it is thoroughly dispersed throughout the tank by the agitated liquid. The blended fluid is pumped from one end of the tank continuously. An ejector, or booster jet, is provided at the inlet of the pump suction pipe by a secondary conduit which bypasses the blender tank and directs a stream of the liquid into the end of the suction pipe to assist the pump in drawing blended fluid into the suction pipe.

The liquid is pumped under pressure into the blender tank where it flows through a manifold that has a plurality of nozzles through which the liquid is directed outwardly to cause agitation and thorough mixing of the solid particles with the liquid. A flow meter in the liquid supply conduit indicates the rate of flow of liquid into the tank. The dispenser for a propping agent may be adjusted as necessary in accordance with the indicated flow rate of the liquid to produce a fracturing fluid having a predetermined concentration of propping agent. Other additives may be supplied from a separate dispenser to the blender tank where they are mixed with the fracturing fluid before it flows into the pump suction pipe.

Description of the drawings

This preferred embodiment is illustrated in the accompanying drawings in which:

FIG. 1 is a schematic view, partially in cross section, of the apparatus of this invention;

FIG. 2 is a side elevational view of the apparatus of this invention; and

FIG. 3 is a cross sectional view of the apparatus along the line 3—3 in FIG. 2.

Description of the preferred embodiment

Referring to FIG. 1, the system of this invention includes a source of fluid 2, which may be in the form of one or more liquid storage tanks at the well site. A pump 4 supplies fluid from the source 2 to a blending tank or tub 6 through an agitating manifold 8. The rate of flow of fluid may be controlled by a valve 10. Also, the rate of flow is measured by a flow meter 12. Preferably, the flow meter 12 is of the type that has a turbine that is rotated by the flow of fluid through the meter, and an electrical pickup device measures the speed of rotation of the turbine and transmits impulses to an instrument 14 that indicates the rate of flow of fluid through the meter 12.

A portion of the fluid from the pump 4 bypasses the manifold and flows through a conduit that includes a valve 15 to a jet booster nozzle 16. The nozzle 16 is positioned at the inlet of a discharge pipe 18. A portion of the fluid from the pump 4 also may be diverted through an additive disperser 20 when the valve 22 is opened. Sand or other propping agent is stored in a hopper 24 that is mounted over the blending tub 6. A valve at the bottom of the hopper is controlled by a handle 26 that is calibrated to indicate the rate of flow of sand into the tank corresponding to a predetermined position of the valve handle.

The agitating manifold 8 has a plurality of nozzles along its length that direct liquid streams into the bottom of the tub 6 with sufficient velocity to cause thorough agitation of the liquid in the tub. As the sand drops from the hopper 24 into the tub, it is thoroughly mixed with the liquid. The blended fracturing fluid is drawn out of the tub 6 continuously through the discharge pipe 18 by a suction pump 28, from which the blended fluid is conducted to a well head 30 where it is pumped down the casing string.

For convenience, the fluid supply pump 4 and the displacement pump 28 may be mounted on a truck. The blending tub 6 and the remainder of the equipment may be transported on the same truck with the pump. Thus, the apparatus of this invention may be readily transported from one well site to another.

Referring to FIGS. 2 and 3, fluid from the pump 4 may be conducted through flexible hoses 32 to an input manifold 34. The manifold 34 is connected to the flow meter 12 by a pipe section 36. The instrument 14 preferably converts the signal from the turbine of the meter 12 to indicate the quantity of sand required to be blended to obtain a desired concentration of sand in the blended fluid. The instrument 14 also indicates the total liquid and total sand used during the elapsed time since the process started. The flow meter and the input manifold 34 are connected in the fluid conduit by means of conventional snap joint type couplings 38. These couplings permit the conduit to be disassembled readily. A branch 40 of the conduit conducts fluid through a manually controlled valve 22 to the additive disperser 20. The fluid mixes with the additive from the hopper of the disperser and the fluid containing the additive drops into the tub 6 from the outlet pipe 42.

A pipe section 44 from the valve 10 is connected with one end of the agitating manifold 8 by a union 46, and the opposite end of the manifold 8 is in the form of an elongated pipe section 48. A plurality of nozzles 50 are secured along both sides of the pipe section 48. The nozzles 50 are preferably in the form of short lengths of rigid tubing that are welded or otherwise secured in holes uniformly spaced along the length of the pipe 48. The nozzles 50 each direct a stream of fluid generally downwardly and toward one end of the tub 6.

The nozzles 50 are arranged to cause the liquid stream to follow a swirling path that sweeps across the bottom of the tub and up the side wall, and at the same time conveys the sand that is deposited from the hopper 24 toward the discharge pipe 18. In order to accomplish this function, the axis of each nozzle 50, when projected on a horizontal plane that passes through the central axis of the pipe section 48, should intersect the pipe section axis at an an angle between about 15° and about 60°, and preferably at an angle of about 45°. The nozzle axis when projected on a transverse vertical plane, such as the plane of FIG. 3, should intersect a vertical axis passing through the central axis of the pipe section 48 at an angle of between about 30° and about 90°, and preferably at an angle of about 45°. The axis of each nozzle 50 slopes downwardly at an angle of between about 15° and about 60°, and preferably at about 45°, as measured by projecting the nozzle axis on a vertical plane extending longitudinally of the pipe section 48, such as the plane of FIG. 2.

In addition, there may be an auxiliary nozzle 52 at the closed end of the pipe section 48 for directing a fluid stream into the area between the end of the pipe section 48 and the end wall of the tub 6. The pipe section 48 is mounted on brackets 54 at opposite ends which space the nozzles 50 above the bottom of the tub 6, thus providing maximum agitation of the fluid in the tub.

The tub 6 preferably has a width that is no greater than four times the width spanning the outlet ends of the nozzles 50 in order to assure that adequate turbulence of the liquid is produced along the sides of the tub. As shown in FIG. 3, the lower corners of the tub 6 are preferably rounded to cause the fluid stream from the nozzles 50 to flow upwardly along the walls of the tub.

A bypass conduit 56 conducts fluid from the valve 10 to a jet booster assembly 16. An orifice plate may be provided in the union 46 to equalize the fluid pressure in the conduits 44 and 56. Usually, the discharge pipe 18 is coupled directly to the suction pipe of the pump 28, and in this manner, the discharge pipe 18 is rigidly mounted above bottom of the tub 6. The booster assembly 16 is preferably secured to the discharge pipe 18 by a web 58 which is welded or otherwise secured to a vertical pipe section 60. A jet nozzle 62, as shown schematically at 16 in FIG. 1, is positioned in the opening at the lower end of the discharge pipe 18. Since the nozzle is rigidly rigidly mounted on the discharge pipe by means of the web 58, the position of the jet nozzle 62 is permanently fixed at a predetermined position for obtaining the optimum fluid flow conditions.

The sand hopper 24 is mounted on a frame 64 which extends across from one side of the tub 6 to the other. The frame 64 is positioned approximately midway of the length of the tub 6. Due to the angular orientation of the nozzles 50 relative to the pipe section 48, the sand from the hopper is generally confined to the right half of the tub, as viewed in FIG. 2, where most of the blending takes place. A valve 66 controls the flow of sand or other material out through the bottom of the hopper 24 from which it falls into the tub 6. The valve 66 is controlled by a handle 68 which is mounted for swinging movement on brackets attached to the side of the hopper 24. A scale 70 indicates the rate of flow of sand out of the hopper in relation to the position of the handle 68. For convenience, the instrument 14 may be mounted on the rim of the hopper 24 adjacent to the handle 68 by means of a bracket, so that the operator may readily observe the flow rate while he is adjusting the handle 68. The tub 6 is also provided with an outlet pipe 72 that is fitted with a cap 74, so that the contents of the tub may be drained while the tube is washed out after completion of the process.

In operation, the agitating manifold 8 is placed in the center of the cementing tub and is assembled with the conduit 36 at the union 46. If necessary, an orifice plate having an opening of approximately the same diameter as that of the conduit 56 is installed in the union 46. The snap joint couplings 38 are used for coupling the flow meter 12 and the inlet manifold 34 to the conduit 36. A coupling 38 also connects the valve 10 and meter 12 together. The hoses from the pump 4 are connected to the inlet manifold 34 and the discharge pipe 18 is connected to the suction side of a displacement pump 28. The sand hopper 24 is placed on the top of the tub 6, as shown in FIGS. 2 and 3, and the instrument 14 is positioned near the hopper 24 so it can be viewed by the operator. The instrument 14 is connected to the flow meter 12 by a cable. The valve 10 is adjusted to provide the desired fluid flow rate and the handle 68 on the sand hopper 24 is positioned to provide a corresponding flow of sand into the tub 6. If desired, additives may be dispensed from the hopper 20 by opening the valve 22 to direct a portion of the liquid through the conduit 40.

The method and apparatus of this invention provides a means for blending insoluble, solid particulate material with fluids in an efficient manner although relatively low flow rates are required. Due to the structure of the apparatus, substantially the entire batch of blended fluid is conducted into the well and very little of the fluid remains in the blending tub at the completion of the operation. The jet booster supplements the suction produced by the displacement pump to permit pumping of blended fluids over a relatively wide range of flow rates. The apparatus and method also is economical because only a small investment is required in equipment and two men can perform a small fracturing job, while obtaining accurately controlled sand concentrations. Changes in concentrations may be made quickly. The apparatus may be easily transported from one well site to another and due to the low cost involved, fracturing jobs which heretofore were considered prohibitively expensive can now be performed.

We claim:
1. A method for blending liquid and solid, insoluble particulate material comprising conducting a stream of said liquid into a tank through a plurality of nozzles in said tank with sufficient velocity to agitate the contents of said tank, said nozzles being directed toward one end of said tank, conducting said particulate material into said tank, and continuously pumping a blend of said fluid and particulate material out of said tank.

2. The method according to claim 1 wherein said blend is pumped out of said tank at approximately the same rate as said liquid is conducted into said tank.

3. A method for blending liquid and solid, insoluble particulate material comprising conducting a stream of said liquid into a tank with sufficient velocity to agitate the contents of said tank, conducting said particulate material into said tank, continuously pumping a blend of said fluid and particulate material out of said tank through a suction pipe of a pump extending into said tank, and directing a secondary stream of said liquid into said suction pipe, whereby said secondary stream acts as a booster to assist said pump in drawing said blend into said suction pipe.

4. A method for blending liquid and solid, insoluble particulate material for use in well operations comprising pumping said liquid from a supply source to an elongated tank, measuring the rate of flow of said liquid into said tank, conducting said liquid into said tank through a plurality of nozzles in said tank, said nozzles being directed toward one end of said tank, dispensing said particulate material at a predetermined rate into said tank adjcent said nozzles, pumping said blended liquid and particulate material from said tank through a discharge pipe at one end of said tank, and conducting said blended liquid and particulate material into a well.

5. The method according to claim 4 including conducting a portion of said liquid in a bypass around said nozzles and directly into said discharge pipe.

6. Apparatus for blending liquid and solid, insoluble particulate material comprising a tank, a manifold in said tank, said manifold having a plurality of openings therein for directing liquid outwardly therefrom, means for dispensing said particulate material into said tank, means for supplying said liquid to said manifold, pump means for drawing a blend of said liquid and particulate material out of said tank, said pump means including a suction pipe extending into said tank, and jet means in said suction pipe, means for conducting liquid from said supplying means to said jet means, whereby liquid from said manifold agitates the contents of said tank and liquid flowing through said jet means assists the pump in drawing the blend out of the tank.

7. The apparatus according to claim 6 wherein said tank is elongated, said manifold being substantially tubular and extending longitudinally of said tank.

8. The apparatus according to claim 7 wherein said manifold includes a pipe section extending longitudinally of said tank and a plurality of tubular nozzles projecting laterally from said pipe section, said nozzles having an outlet opening oriented along an axis inclined toward one end of said tank, said suction pipe being positioned adjacent said one end of the tank, and said material dispensing means being positioned to dispense said material into said tank between said suction pipe and the opposite end of said tank.

9. The apparatus according to claim 6 including means for measuring the flow rate of said liquid into said tank, said dispensing means including valve means for controlling the rate of flow of said material into said tank, whereby said blend weight may be regulated.

10. Apparatus for drawing fluid out of a tank comprising suction pump means, a pipe connected with the suction side of said pump means, said pipe having an inlet opening in said tank, a nozzle in said pipe adjacent said inlet opening, said nozzle being aligned with the direction of flow of fluid through said pipe toward said suction pump, and means for supplying fluid to said nozzle under pressure to produce a high velocity fluid jet directed into said pipe, whereby the flow of said fluid out of said nozzle assists the pump in drawing fluid into the pipe.

References Cited
UNITED STATES PATENTS

| | | | |
|---|---|---|---|
| 1,684,370 | 9/1928 | Schuster | 259—147 |
| 1,992,208 | 2/1935 | Harrison | 259—178 |
| 2,005,800 | 6/1935 | Boyle | 259—4 |
| 2,048,913 | 7/1936 | Apple | 259—178 |

ROBERT W. JENKINS, *Primary Examiner.*